Patented Aug. 16, 1949

2,479,442

UNITED STATES PATENT OFFICE 2,479,442

DECARBOXYLATION OF 2-HYDROXY-3-CARBOXYL PYRAZINE

John Weijlard, Westfield, and Max Tishler, Rahway, N. J., assignors to Merck & Co., Inc., Rahway, N. J., a corporation of New Jersey No Drawing. Original applications September 18, 1943, Serial Nos. 502,967 and 502,969. Divided and this application April 25, 1946, Serial No. 664,978

3 Claims. (Cl. 260—250)

This application is a division of our co-pending applications Serial Nos. 502,967 and 502,969, now abandoned, both filed on September 18, 1943.

This invention relates to processes for the production of pyrazine derivatives, and more particularly it relates to the production of such derivatives from corresponding poly-nuclear compounds containing a lumazine nucleus.

The pyrazine derivatives with which the present invention is concerned are difficult to prepare by processes heretofore available. The present invention is of great value, therefore, since it permits the preparation of such pyrazine derivatives in good yield, and by simple, economical procedures utilizing readily available and relatively inexpensive starting materials.

The polynuclear compounds which may be utilized as starting materials according to our invention are lumazine, substituted lumazines including mono- and di-alkyl and mono- and di-phenyl-substituted lumazines, and phenanthralumazine. Diphenyl lumazine can be prepared by the process disclosed in the Journal of the Ind. Chem. Society, 14, 627 (1937); and phenanthralumazine can be prepared by the process disclosed in Berichte, 70, 761 (1937).

We have found that the pyrimidine ring in these polynuclear compounds may be hydrolytically split, by treatment thereof with an alkali metal hydroxide, in aqueous solution. Depending upon the conditions employed, the reaction product thus obtained may comprise the alkali metal salts of 2-amino-3-carboxyl pyrazines, 2-hydroxy-3-carboxyl-pyrazines, or mixtures thereof.

Within the purview of our invention, and as a specific embodiment thereof, we have found that it is possible, when employing lumazine, to control the reaction so that either the alkali metal salt of 2-amino-3-carboxyl pyrazine, or the alkali metal salt of 2-hydroxy-3-carboxyl pyrazine is obtained in practically quantitative yield, or in substantially preponderant amounts. According to our invention, the substantially selective production of either the alkali metal salt of 2-amino-3-carboxyl pyrazine, or 2-hydroxy-3-carboxyl pyrazine, is achieved by controlling the amount of alkali metal hydroxide employed in the reaction. Generally speaking, when an excess of alkali metal hydroxide is reacted with the polynuclear compound, preponderant quantities of the alkali metal salt of 2-hydroxy-3-carboxyl pyrazine are produced, with correspondingly diminished quantities of the 2-amino-3-carboxyl pyrazine compound. Our invention, then, further comprises the determination of optimum conditions for the substantially selective production of either alkali metal salts of 2-amino-3-carboxyl pyrazine, or of 2-hydroxy-3-carboxyl pyrazine.

The amount of alkali metal hydroxide to be used for the preferred production of the alkali metal salt of 2-amino-3-carboxyl pyrazine is preferably in the neighborhood of from 1 to 3 mols of alkali metal hydroxide to one mol of lumazine. Quantities of alkali metal hydroxide substantially in excess of 1–3 mols to one mol of lumazine tend to favor the production of larger amount of the alkali metal salt of 2-hydroxy-3-carboxyl pyrazine.

Table I illustrates the results obtained by reacting one mol of lumazine with varying quantities of sodium hydroxide, in aqueous solution, under varying conditions. The table shows the yield of crude 2-amino-3-carboxyl pyrazine, and also the yield of crude and pure 2-amino pyrazine, after decarboxylation, as well as the overall yield on the basis of lumazine.

TABLE I

*Results obtained on treating one mol of lumazine with varying quantities of sodium hydroxide*

| Yield | #1 | #2 | #3-4 | #5 | #6 | #7 | #8 | #9 | #10 | #11 |
|---|---|---|---|---|---|---|---|---|---|---|
|  | 4 moles NaOH, 24 hours, 170° C., Bomb ⅔ full | 3.25 moles NaOH, 21 hrs., 170° C., Bomb ⅔ full | 3.25 moles NaOH, 15-18 hrs., 170° C., Bomb ⅙ full | 3.25 moles NaOH, 11 hrs., 170° C., Bomb ⅙ full | 3.25 moles NaOH, 8 hrs., 170° C., Bomb ½ full | 3.11 moles NaOH, 2 hrs., 170° C., Bomb ⅔ full | 3.11 moles NaOH, 2 hrs., 170° C., Bomb ⅔ full | 2.82 moles NaOH, 2 hrs., 150° C., Bomb ⅔ full | 2.00 moles NaOH, 8 hrs., 170° C., Bomb ⅔ full | 2.25 moles NaOH, 4 hrs., 170° C., Bomb ⅔ full |
| % Crude Amino Acid | 91.0%, No M. P. 210° | 89.0%, M. P. 192-194° | 85.0%, M. P. 192-194° | 80.4%, M. P. 191-193° | 92.0%, M. P. 192-194° | 86.1%, M. P. 198° (+) | 84.5%, M. P. 198° (+) | 94.0%, M. P. 200° (+) | 93.5%, M. P. 198° | 84.7%, M. P. 198° |
| % Crude Amino Pyrazine | 100% | 85.3%, M. P. 95° | 87.4%, M. P. 95° | 80.3%, M. P. 95° | 85.3%, M. P. 95° | 93.5%, M. P. 118-120° | 93.5%, M. P. 118-120° | 92.9%, M. P. 118-120° | 92.1%, M. P. 116° | 88.8%, M. P. 118-120° |
| % Pure Amino Pyrazine | 7.5%, M. P. 118-120° | 58.5%, M. P. 118-120° | 51.1%, M. P. 118-120° | 62.5%, M. P. 118-120° | 59.8%, M. P. 118-120° | | | | 70.4%, M. P. 118-120° | |
| % Overall Yield on Basis of Lumazine | 6.8% | 44.4% | 38.0% | 40.3% | 46.9% | 80.5% | 79.0% | 87.3% | 60.6% | 75.2% |

As will be observed from the table, the optimum amount of sodium hydroxide to be employed for the production of best yields of the sodium salt of 2-amino-3-carboxyl pyrazine from lumazine is about 2.8 mols per mol of lumazine. As the ratio of sodium hydroxide to lumazine is increased, the yield of the 2-amino-3-carboxyl pyrazine salt is correspondingly diminished. However, even at 4 mols of sodium hydroxide to one mol of lumazine, some sodium salt of 2-amino-3-carboxyl pyrazine is obtained, although the reaction product comprises a preponderant amount of the sodium salt of 2-hydroxy-3-carboxyl pyrazine.

In the case of the substituted lumazines, which are more resistant to hydrolytic splitting, larger amounts of alkali metal hydroxide are required for the production of both the corresponding alkali metal salt of the 2-amino-3-carboxyl pyrazine and the 2-hydroxy-3-carboxyl pyrazines, generally in excess of 3 mols of alkali metal hydroxide to one mol of substituted lumazine being required for the production of the alkali metal salt of the 2-amino-3-carboxyl pyrazine. Preferred conditions for the treatment of such substituted lumazines, according to our invention, will be apparent from the specific examples given below.

The hydrolytic splitting of the pyrimidine ring of polynuclear compounds containing the lumazine nucleus, according to our invention, may be carried out at atmospheric pressure, or at increased pressure. The temperature and time-of-reaction conditions will vary depending upon the pressure employed.

After hydrolytic splitting of the pyrimidine ring has been effected, the reaction mixture containing the alkali metal salts of the 2-amino and/or 2-hydroxy-3-carboxyl pyrazines may be worked up in any suitable manner. The free acids may be recovered by adjusting the pH of the reaction mixture to 2-3, and collecting the crystalline material obtained. It is also possible to obtain the free acids by converting the alkali metal salt to a barium salt, and then acidulating an aqueous suspension of such barium salt, as will appear from the various examples given herein.

The following examples illustrate methods of carrying out the present invention, but it is to be understood that these examples are given by way of illustration and not of limitation.

EXAMPLE I

Hydrated lumazine, corresponding to 20 gms. of anhydrous material, is added to a solution of 11 gms. of sodium hydroxide in 80 cc. of water, and the mixture is heated in a steel bomb for eight hours at 170° C. The reaction mixture is acidulated with hydrochloric acid to pH 2.5, and chilled to 2° C. 2-amino-3-carboxyl pyrazine crystallizes out. The crystals are collected and washed with ice water. Yield, 15.85 gms.; M. P. 198° C.

This product may be further purified by dissolving it in boiling water, adjusting the pH to 2.5 with hydrochloric acid, decolorizing, filtering, chilling, and washing and drying the crystals thus obtained. M. P. 201° C.

EXAMPLE II 3 gms. of crude 7-methyl lumazine are added to a solution of 6 gms. of sodium hydroxide in 30 cc. of water, and the mixture is boiled under reflux for 50 hours. The solution is diluted with 200 cc. of water, neutralized with hydrochloric acid, and made slightly ammoniacal. 10 cc. of 30% barium chloride solution are added, and the mixture is chilled at 2° C. for about 12 hours. The crystals are collected on a filter, washed with ice water, and dried in vacuo; yield, 2.50 gms. barium salt.

The barium salt is suspended in 200 cc. of water, 10 cc. of 10% hydrochloric acid are added, and the mixture is heated to boiling. After adding a little decolorizing black, the hot solution is filtered, then chilled at 2° C. for about 12 hours. 2-amino-3-carboxyl-6-methyl pyrazine crystallizes out. The crystals are washed with ice water and dried; yield, 0.95 gm. of 2-amino-3-carboxyl-6-methyl pyrazine; M. P. 211° C.

EXAMPLE III 3 gms. of crude 6,7-dimethyl lumazine are added to a solution of 6 gms. of sodium hydroxide in 30 cc. of water, and the mixture is boiled under reflux for 50 hours. The mixture is worked up in accordance with the procedure described in Example II. Yield, 2.95 gms. of the barium salt of 2-amino-3-carboxyl-5,6-dimethyl pyrazine. From the barium salt, 1.10 gms. of 2-amino-3- carboxyl-5,6-dimethyl pyrazine are obtained. The product may be further purified by dissolving it in boiling water containing a small quantity of hydrochloric acid, chilling the clear solution, etc. 2-amino-3-carboxyl-5,6-dimethyl pyrazine of M. P. 209–210° C., with decomposition, is thus obtained.

EXAMPLE IV 3 gms. of crude 6,7-diphenyl lumazine are added to a solution of 6 gms. of sodium hydroxide in 30 cc. of water, and the mixture is boiled under reflux for 35 hours. An oily mass separates; the mass solidifies to a tough lump on cooling. The solution is decanted off, and the mass is washed with some ice water and dried in vacuo. Yield, 2.8 gms. of crude sodium salt of 2-amino-3-carboxyl-5,6-diphenyl pyrazine. The sodium salt is dissolved in 30 cc. of warm water, and the barium salt of 2-amino-3-carboxyl-5,6-diphenyl pyrazine is precipitated with barium chloride solution. Yield, 2.57 gms. The barium salt is suspended in 50 cc. of water, 10 cc. of 10% hydrochloric acid are added, the mixture is heated to 80° C. and a sufficient amount of methanol (200 cc.) is added to dissolve the liberated compound. The hot solution is filtered, and diluted with four volumes of water. 2-amino-3-carboxyl-5,6-diphenyl pyrazine precipitates in the form of fine crystals, which are washed and dried. Yield, 1.50 gms.; M. P. 188° C., with decomposition. The product is dissolved in ethyl ether, the ether insoluble substance is filtered off, and the ether solution is concentrated to a small volume. Petroleum ether is added, and 2-amino-3-carboxyl-5,6-diphenyl pyrazine precipitates out and is collected on a filter and dried. M. P. 189° C., with decomposition.

EXAMPLE V 9 gms. of phenanthralumazine are added to a solution of 9 gms. of sodium hydroxide in 75 cc. of water, and the mixture is held in a steel bomb at 225–235° C. for 20 hours. The reaction mixture is dissolved in 1000 cc. of boiling water, the solution is treated with some charcoal, filtered, and acidulated with hydrochloric acid to pH 2. 2-amino-3-carboxylphenanthrapyrazine precipitates in the form of bright yellow crystals, which are washed with water and dried at 80° C. Yield, 7.0 gms.; M. P. 219–221° C. The product may be further purified by dissolving it in aqueous sodium bicarbonate solution, decolorizing, re-precipitating with acid, and washing and drying the crystals thus obtained. M. P. 220–222° C.

EXAMPLE VI 2 gms. of 2-amino-3-carboxyl pyrazine are dissolved in 20 cc. of 20% sodium hydroxide solution, and the mixture is heated in a steel bomb at 170° C. for 20 hours. The reaction mixture is diluted with 50 cc. of water and acidulated with hydrochloric acid to pH 2.5–3. 2-hydroxy-3-carboxyl pyrazine is obtained in the form of crystals, which are washed with ice water and dried. Yield, 1.62 gms.; M. P. 218–220° C. This product may be further purified by dissolving it in aqueous sodium bicarbonate solution, decolorizing, re-precipitating with acid, etc. The white compound thus obtained melts at 218–220° C.

EXAMPLE VII 125 gms. of lumazine are added to a solution of 122 gms. of sodium hydroxide in 600 cc. of water, and the mixture is heated at 170° C. for 24 hours in a bomb. The reaction mixture is diluted with water and acidulated with hydrochloric acid to a pH of 2.5–3. The crystals thus obtained are collected, washed with ice water, and dried. The 2-hydroxy-3-carboxyl pyrazine thus obtained may be further purified by dissolving it in aqueous sodium bicarbonate solution, decolorizing, re-precipitating with acid, and washing and drying the crystals thus obtained. Yield, 96.4 gms.; 91% of theory; M. P. 218–220° C.

EXAMPLE VIII 22.3 gms. of anhydrous 7-methyl lumazine and 24 gms. of sodium hydroxide in 140 cc. of water are heated at 170–175° C. for 20 hours in a steel bomb. The reaction mixture is made acid with hydrochloric acid (pH 2.5), and chilled to 2° C. for two hours. The crystals are collected and washed with 5x10 cc. of ice water, then dried at 80° C. Yield of 2-amino-3-carboxyl-6-methyl pyrazine, 14.62 gms.; M. P. 211° C.

EXAMPLE IX 2.7 gms. of 6,7-dimethyl lumazine and 2.7 gms. of sodium hydroxide in 25 cc. of water are heated at 170–175° C. in a steel bomb for 20 hours. The reaction mixture is rinsed out of the bomb with 25 cc. of hot water, made acid with hydrochloric acid (pH 2.5), and chilled to 2° C. for two hours. The solid is collected on a filter, washed with ice water, and dried at 80° C. Yield of 2-amino-3-carboxyl-5,6-dimethyl pyrazine, 2.15 gms.; M. P. 210° C.

In addition to the sodium hydroxide specifically recited in the foregoing examples, other alkali metal hydroxides as, for instance, potassium hydroxide, may likewise be employed with similar favorable results.

The 2-amino-3-carboxy pyrazines, or 2-hydroxy-3-carboxyl pyrazines, may be converted to the corresponding 2-amino pyrazines or 2-hydroxy pyrazines by heating the same with substances which are decarboxylating agents therefor.

Solvents which we have found suitable for our purposes are, for example, water, the acetate of diethylene glycol monoethylether, n-butyl phthalate, sulfuric acid, and liquid petrolatum.

The 2-amino-3-carboxyl pyrazine, or 2-hydroxy-3-carboxyl pyrazine, is heated with the selected solvent, preferably at temperatures between 150–190° C. or above. The reaction product is then worked up in any suitable manner. For example, it may be decolorized by the addition thereto of a small quantity of a decolorizing black, such as the product known as "Darco," for instance, filtered, and the filtrate may then be treated with a solvent such as petroleum ether which precipitates the decarboxylation product.

During the reaction, it is desirable to stir the solution of the 3-carboxyl pyrazine in the selected solvent constantly, and it is preferable to carry out the decarboxylation procedure in equipment provided with a suitable stirring device.

The following examples illustrate methods of carrying out the decarboxylation procedure.

EXAMPLE X 1 gm. of crude 2-amino-3-carboxyl pyrazine is suspended in 20 cc. of liquid petrolatum, and the mixture is heated at 195° C. for 20 minutes, under fast mechanical stirring. The mixture is cooled, filtered, and the solid is washed with petroleum ether. The black residue is dissolved in either, any carbonized material is filtered off, and the either is distilled off. Yield, 0.55 gm. of 2-amino pyrazine; 80.4% of theory.

EXAMPLE XI 1 gm. of crude 2-amino-3-carboxyl pyrazine in 3 cc. of n-butyl phthalate is heated at 215–220° C. until evolution of $CO_2$ ceases. The reaction mixture is cooled. 10 cc. of petroleum ether are added. The mixture is cooled to 0° C. The solid which forms is filtered off, and washed with petroleum ether. Yield of 2-amino pyrazine, 0.678 gm.; 99.3% of theory. This product may be further purified by dissolving it in 10 cc. of 10% sodium hydroxide and extracting the solution with ether.

EXAMPLE XII 0.50 gm. of 2-amino-3-carboxyl pyrazine in 10 cc. of water is heated in a bomb for 10 hours at 150° C. Excess 30% sodium hydroxide is added, and the mixture is extracted to completion with ether, and the ether extracts are taken to dryness. Yield of 2-amino pyrazine, 65.8% of theory.

EXAMPLE XIII

The sodium salt of 2-amino-3-carboxyl pyrazine is dissolved in water. The pH of the solution is adjusted to about 2 by the addition of hydrochloric acid. The mixture is heated in a bomb for 10 hours at 150° C., extracted with ether, and the ether extracts are taken to dryness. Yield of 2-amino pyrazine, about 65.8% of theory.

EXAMPLE XIV 25 gms. of crude 2-amino-3-carboxyl pyrazine are mixed with 75 cc. of the acetate of diethylene glycol monoethylether and boiled under reflux for 15 minutes. 1 gm. of decolorizing black is added to the hot reaction mixture, which is then filtered while hot, and the filtrate is washed with about two 5 cc. portions of hot diethylene glycol monoethylether acetate. 225 cc. of petroleum ether are added, and the mixture is chilled to 0° C. The crystals are collected, washed with petroleum ether, until free of the acetate of diethylene glycol monoethylether and dried. Yield of 2-amino pyrazine, 14.0 gms.; 82.3% of theory.

EXAMPLE XV 25 gms. of crude 2-amino-3-carboxyl pyrazine are mixed with 75 cc. of nitrobenzene, and boiled under reflux for 15 minutes. 1 gm. of decolorizing black is added to the hot reaction mixture, which is then filtered while hot, and the filtrate is chilled to room temperature. 300 cc. of petroleum ether are added, with stirring. The mixture is permitted to stand for about 10 minutes, after which the crystalline material is collected, washed repeatedly with petroleum ether, and dried. Yield of 2-amino pyrazine, 15.9 gms.; 93.5% of theory.

EXAMPLE XVI 25 gms. of 2-amino-3-carboxyl pyrazine and 75 cc. of quinoline are heated for 10 minutes at 215–217° C. 1 gm. of decolorizing black is added to the hot reaction mixture, which is filtered while hot, and the filtrate washed with about two 5 cc. portions of hot quinoline. 225 cc. of petroleum ether are added, and the mixture is chilled to 0° C. The crystals are collected, washed with petroleum ether until free from solvent, and dried. Yield of 2-amino pyrazine, 15.9 gms.; 93.5% of theory.

EXAMPLE XVII

One gm. of the sodium salt of 2-amino-3-carboxyl pyrazine is mixed with 10 cc. of preheated 100% sulfuric acid, and the mixture is held at 240–245° C. for 15 minutes. The reaction mixture is diluted with ice, made alkaline with 30% sodium hydroxide solution and extracted with ether. The ether extract is evaporated to dryness. Yield of 2-amino pyrazine, 0.46 gm. or 78.3% of theory.

EXAMPLE XVIII

Five gms. of 2-amino-3-carboxyl pyrazine are mixed with 50 cc. of preheated 100% sulfuric acid, and the mixture is held at 240–245° C. for 15 minutes. The reaction mixture is diluted with ice, made alkaline with 30% sodium hydroxide solution and extracted with ether. The ether extracts are evaporated to dryness. Yield of 2-amino pyrazine, 3.08 gms.; 90% of theory.

EXAMPLE XIX

Five gms. of 2-hydroxy-3-carboxyl pyrazine are mixed with 15 cc. of the acetate of diethylene glycol monoethylether and boiled under reflux for 10 minutes. The mixture is cooled and 50 cc. of petroleum ether are added. The crystals are collected and washed with petroleum ether. Yield of 2-hydroxy pyrazine, 3.09 gms.; 90.1% of theory.

EXAMPLE XX

Five gms. of 2-amino-3-carboxyl-6-methyl pyrazine in 50 cc. of 80% sulfuric acid are heated under reflux at 200° C. for ten minutes. 150 gms. of ice are added, followed by 250 cc. of 30% sodium hydroxide. The alkalinized solution is extracted to completion with six 200 cc. portions of ether at 30° C. The ether is distilled off, and the residue is dried. Yield of 2-amino-6-methyl pyrazine, 3.27 gms.; 91.8% of theory; M. P. 125–127° C.

EXAMPLE XXI 2.15 gms. of 2-amino-5,6-dimethyl-3-carboxyl pyrazine are dissolved in 20 cc. of 80% sulfuric acid, and heated at 195–200° C. under reflux for 10 minutes. 75 gms. of ice are added, followed by 100 cc. of 30% sodium hydroxide. The mixture is extracted at 30° C. with six 100 cc. portions of ether. The ether extracts are taken to dryness, and the residue is dried. Yield of 2-amino-5,6-dimethyl pyrazine, 1.43 gms.; 93.7% of theory; M. P. 147–148° C.

EXAMPLE XXII 0.5 gm. of crude 2-amino-3-carboxyl-5,6-diphenyl pyrazine is added to 10 cc. of 80% sulfuric acid, and the mixture is refluxed for 30 minutes. The reaction mixture is cooled. 50 gms. of ice are added, followed by 25 cc. of 30% sodium hydroxide solution. The insoluble product is filtered off, washed several times with 15% sodium hydroxide solution, and then with water until free from alkali, and dried in vacuo. After one recrystallization from ether, the compound, 2-amino-5,6-diphenyl pyrazine, melts at about 227–228° C.

The parent applications above mentioned, Serial Nos. 502,967 and 502,969, are two of a series of applications upon related subject matter concurrently filed by the applicants Weijlard and Tishler, and in one instance with another applicant. These concurrently filed applications are as follows: Serial No. 502,965, now abandoned, relates to the decarboxylation, by heating with sulfuric acid, of 2-amino-3-carboxy-pyrazines and/or 2-hydroxy - 3 - carboxyl-pyrazines; Serial No. 502,966, now Patent Number 2,447,148, filed August 17, 1948, relates to cleavage of the pyrimidine ring of pyrimidopyrazines by heating the same with an aqueous solution of alkali-metal hydroxide; Serial No. 502,967 relates to the process of Serial No. 502,966 and in addition embraces the recovery of the free amino-carboxy-pyrazines and their decarboxylation; Serial No. 502,968, now abandoned, relates to cleavage of the pyrimidine ring of alloxazine by heating with ammonium hydroxide, followed by acidification and decarboxylation; Serial No. 502,969 relates to the thermal decarboxylation of 2-amino-3-carboxy-pyrazines and/or 2 - hydroxy - 3 - carboxy-pyrazines; Serial No. 502,970, now abondoned, relates to the pyrimidine-ring cleavage of pyrimidopyrazines by treatment with aqeous alkali-metal hydroxide in excess to form alkalimetal salt of corresponding carboxypyrazines; and Serial No. 502,971, now Patent Number 2,431,896, filed December 2, 1947, relates to cleavage of the pyrimidine ring of pyrimidopyrazines by heating same with concentrated sulfuric acid.

Modifications may be made in carrying out the present invention without departing from the spirit and scope thereof, and we are to be limited only by the appended claims.

We claim:

1. The process that comprises heating 2-hydroxy-3-carboxyl-pyrazine at a temperature of at least 150° C. in a high boiling indifferent solvent, and recovering the 2-hydroxy pyrazine thus formed.

2. The process comprising heating under reflux for about 10 minutes 2-hydroxy-3-carboxyl pyrazine in the acetate of diethylene glycol monoethylether, and recovering 2-hydroxy pyrazine.

3. 2-hydroxy pyrazine.

JOHN WEIJLARD.
MAX TISHLER.

REFERENCES CITED

The following references are of record in the file of this patent:

UNITED STATES PATENTS

| Number | Name | Date |
|--------|------|------|
| 2,389,065 | Lee et al. | Nov. 13, 1945 |
| 2,396,066 | Winnek | Mar. 5, 1946 |

OTHER REFERENCES

Maier-Bode, Das Pyridin und seine Derivate, p. 141 (1934 ed.).

Berichte, 67B, pp. 892–908 (1934).

Berichte, 70, pp. 761–768 (1937).